– – –

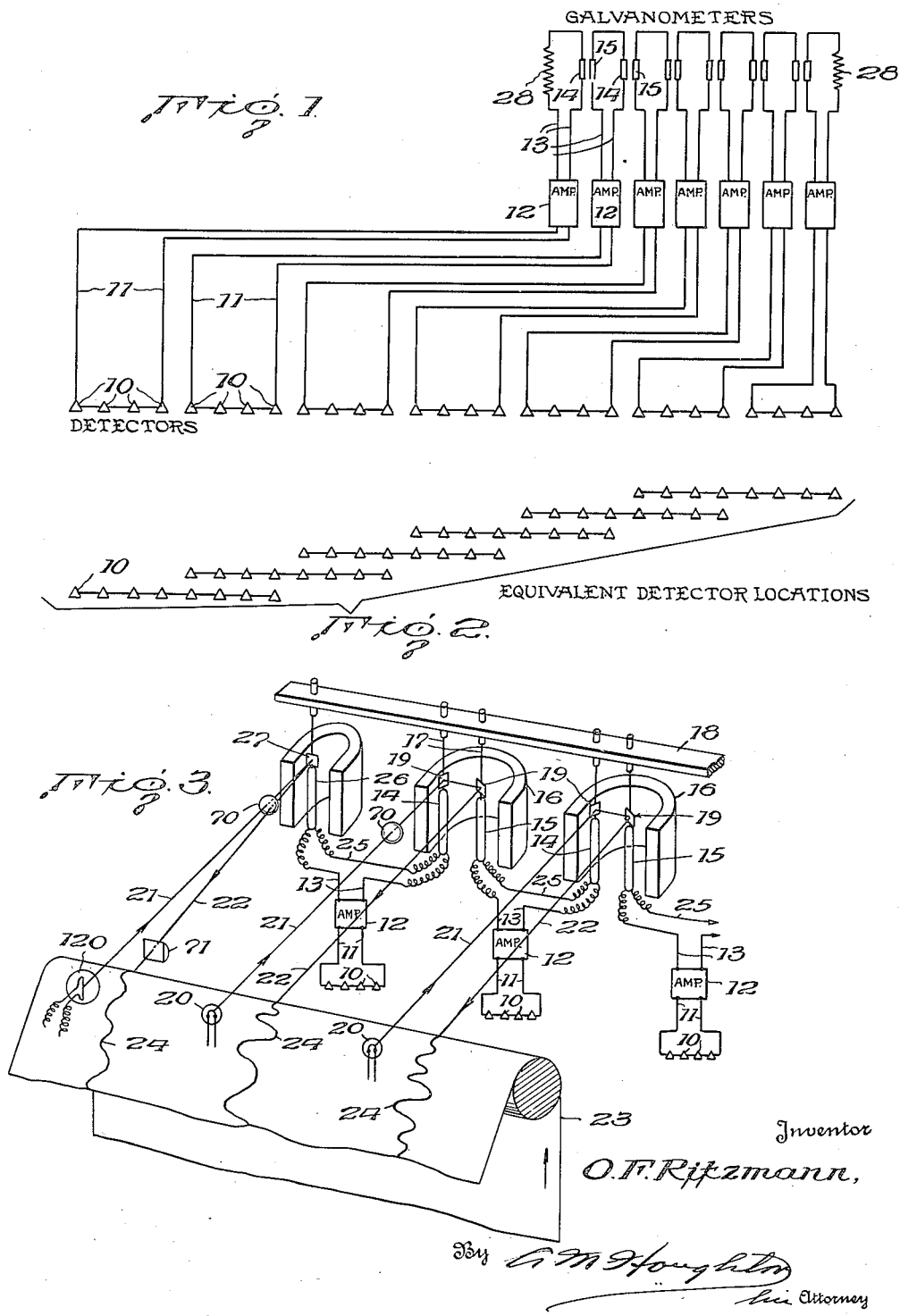

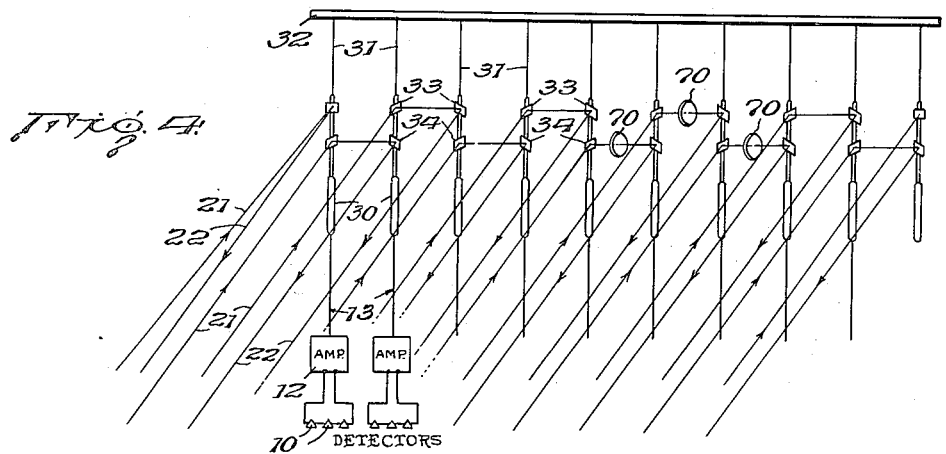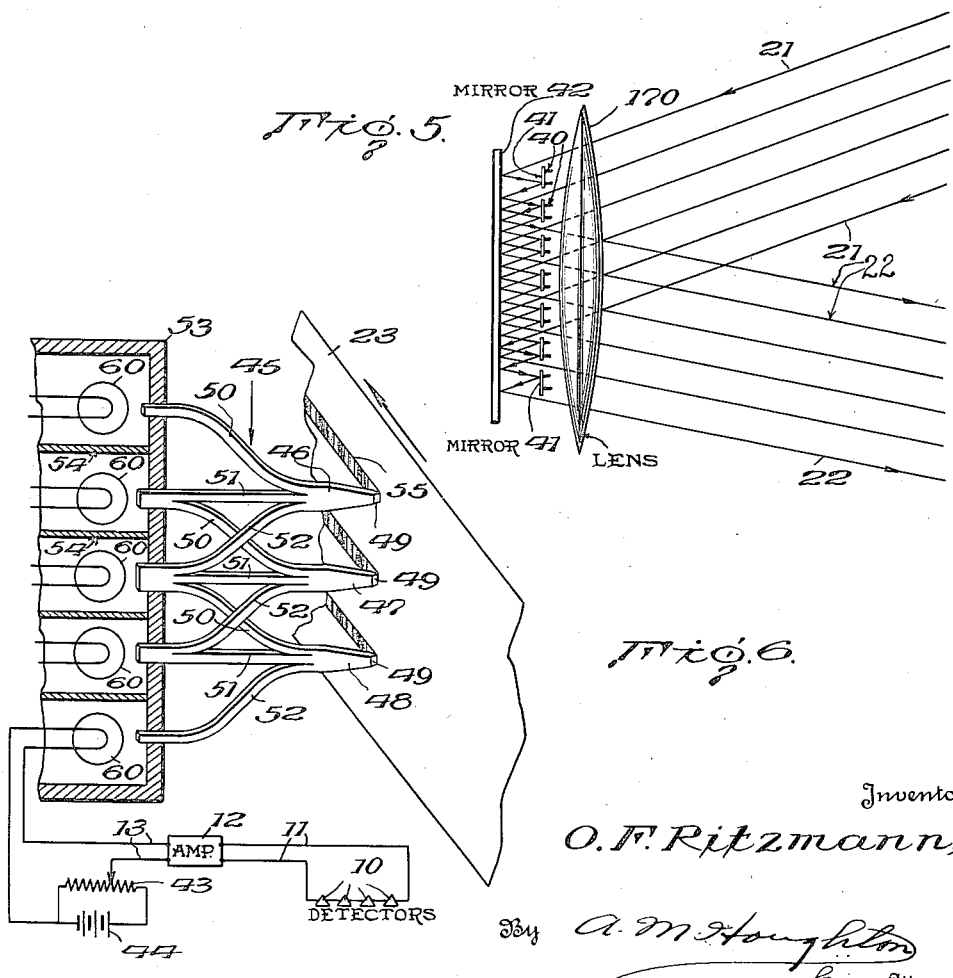

UNITED STATES PATENT OFFICE 2,267,356

APPARATUS FOR AND METHOD OF SEISMOGRAPH RECORDING

Otto F. Ritzmann, Aspinwall, Pa., assignor to Gulf Research & Development Company, Pittsburgh, Pa., a corporation of Delaware Application January 16, 1940, Serial No. 314,162

13 Claims. (Cl. 177—352)

This invention or discovery relates to apparatus for and methods of seismograph recording; and it comprises apparatus for recording seismic detector signals with mixing of signal channels, including a sensitized recording band, a plurality of electro-optical oscillograph recording elements adapted to receiving detector signals and adapted to transmit beams of light to the band and to modify the beams of light proportionally to applied signal energy so as to produce record traces on the band, and so constructed and arranged that at least some of the traces are produced by light beams modified by a plurality of the elements; and it further comprises a method of recording seismic detector signals wherein light beams are modified by separate detector channels and the modified beams are caused to impinge upon a traveling recording surface at the same spot to produce a composite record trace; all as more fully hereinafter set forth and as claimed.

In seismograph prospecting, artificial seismic waves are generated at a point in the earth, as by exploding a charge of dynamite, the seismic waves after reflection and refraction from subterranean strata are detected electro-mechanically by seismograph detectors and the detected waves are amplified and recorded for study. In the recording, the electrical signals from the detectors are applied to electro-optical oscillograph elements. These devices direct a beam of light upon a traveling sheet of photographically sensitized paper or film, and are adapted to modify the light in accordance with the instantaneous amplitude of the detector signals, so as to produce a record trace on the paper corresponding to the fluctuating electrical signals. For example, in one form of oscillograph element the detector signal is applied to a delicate coil of wire mounted between the poles of a permanent magnet and carrying a mirror interposed between a lamp and the paper in such arrangement that on twisting of the coil due to applied signal energy the mirror bends the beam of light to varying degrees depending upon the instantaneous signal strength and thereby produces a wavy trace on the paper. Another form of oscillograph element takes the form of a small lamp shining on the paper, which glows to different degrees of brightness on energization by signal energy and thereby produces a record trace of variable density (blackening).

In modern seismograph prospecting it is customary to use a plurality of detectors, from two to ten or more, for each oscillograph element. Since many oscillograph elements are also used, the total number of detectors may be unduly great, and it is desirable to economize on the number of detectors by employing some of the detectors simultaneously in several different oscillograph circuits. In other words, detector channels are mixed. (The term channel, employed in a sense analogous to its use in the radio broadcasting art, includes all circuit elements in the path of the signal from one detector to the corresponding recording element.) Mixing of detector channels is desirable because the records are clearer and the significant parts of the records are easier to correlate from one record trace to another. Random disturbances are partially canceled. Often without mixing the character of received waves will vary enough from trace to trace as to make correlation of some of the arrivals difficult or impossible. Mingling of channels prevents rapid changes in the character of the recorded arrivals between adjacent traces. It has been proposed to mix the detector channels electrically with the aid of vacuum tube circuits, but such systems require an unwieldy number of vacuum tubes. Transformer coupling systems to achieve the same end have been suggested, but in such circuits there is an undesirable reaction of each detector on the others unless vacuum tubes are provided to couple the transformer secondaries to the oscillograph elements.

Among the objects of the present invention are the provision of an improved recording apparatus in which combination of detector channels is accomplished in a simple manner while reaction of the signals in the several channels upon each other is avoided, and the provision of detector signal mixing or channel combining apparatus in which mixing is accomplished by optical means rather than electrical means, and the provision of such apparatus including a plurality of electro-optical oscillograph elements receiving detector signals and arranged to record the signals as traces with the aid of beams of light directed toward sensitized paper, and so constituted that each trace is made by light flux from a plurality of elements whereby mixing is achieved.

These and other objects are achieved by the provision of a recording apparatus including a plurality of oscillograph elements, adapted to direct a beam of light upon a traveling band of sensitized paper and to modify the beam proportionally to the instantaneous strength of detector signals applied thereto. The light flux from each element, before it impinges on the traveling paper, is modified by at least one of the other elements, so that each trace is a mixed record. In the main embodiment of the invention the oscillograph elements are of the moving-coil galvanometer type with mirror means attached to the coil. Light from a source is reflected from a mirror or mirrors on one coil to a mirror on another coil or coils before it impinges on the traveling paper. In another embodiment, the oscillograph elements take the form of glow lamps arranged to glow with an intensity proportional to the instantaneous strength of the applied signal, and the light flux from each lamp is mixed with the flux from an adjacent lamp or lamps prior to impinging on the traveling paper. In each case, mixing of the detector signals is accomplished optically. There can be no reaction of one signal upon another since the only connection between them is, so to speak, a beam of light.

In the accompanying drawings there are shown more or less diagrammatically several examples of specific embodiments of apparatus within the purview of the invention. In the drawings, Fig. 1 is a diagrammatic view of one form of recording system, employing a plurality of double galvanometers, Fig. 2 is a diagram accompanying Fig. 1 and showing the number of virtual or equivalent detector locations corresponding to the number of actual detector locations in the apparatus of Fig. 1;

Fig. 3 is a perspective view of a portion of the apparatus of Fig. 1;

Fig. 4 is a diagrammatic view of a modified system including a plurality of double-mirror galvanometers;

Fig. 5 is a diagrammatic view of a modified apparatus making use of multiple reflections among galvanometer mirrors, and Fig. 6 is a diagrammatic view of a form of the invention arranged to produce variable-density records.

Referring to the drawings and more particularly to Figs. 1, 2 and 3, a plurality of seismic detectors or seismophones 10 are arranged in groups, shown by way of example as seven groups. The detectors are of conventional type and are located in the earth in a known way. They produce fluctuating electric signals corresponding to terrestrial vibrations. Each group is shown as including four detectors connected in series and delivering a combined electric signal through leads 11. Each pair of leads 11 corresponds to one detector channel. Each channel is amplified by an amplifier 12 of known type and the amplified signal appears in leads 13. A plurality of double oscillograph galvanometers are provided, each including two moving coils 14 and 15 suspended in the gap of a permanent magnet 16 by torsionally-elastic suspensions 17 which are supported from a fixed support 18. Upon energization of each coil it rotates, against the restoring force of the suspension, through an angle proportional to the applied current. Each coil is associated with a mirror 19 disposed at about a right angle with respect to the mirror on the other coil. A light source is provided for each coil set at 20, and directs a light beam 21 from one of the mirrors to the other whence it is returned in the direction shown as a beam 22 impinging on a traveling sheet or band 23 of photographically sensitized paper or film, to form a trace 24. By making the source of light and the mirrors sufficiently small in area, the usual galvanometer lenses for securing a sharp trace can be omitted, with consequent simplification of the apparatus. If lenses are used, it is convenient to provide a single lens 70 of such focal length as to focus the point source 20 on the traveling band; or if desired a linear-filament source 120 can be employed, in conjunction with lens 70 of suitable focal length arranged to refract both the beam 21 entering the mirror and beam 22 leaving it, and a cylindrical lens 71 which concentrates the linear image formed by lens 70, to a point. Other conventional lens arrangements can be used. If desired, a single lens can be provided for all the galvanometer elements when these are sufficiently compactly arranged (Fig. 5).

The amplified detector channels are applied to the galvanometers in the manner shown. Leads 13 from each amplifier go to one side of two coils in two adjacent galvanometers, while the other side of these two coils are connected together at 25. At each end of the set of galvanometers is provided a single galvanometer with coil 26 and a mirror 27 facing as shown. If desired (Fig. 1) the single galvanometer can be replaced by a simple resistance 28 equal to that of a single galvanometer coil.

In operation, considering any one detector channel intermediate the end channels, for example the second channel from the left in Fig. 3, this channel is applied to two different galvanometer coils, 14 and 15, and causes deflection of the mirrors 19 and hence of the light beams reflected from the mirrors. The deflected beams however before they impinge on the paper 23, are additionally deflected by the mirrors on two other galvanometer coils (receiving other detector channels) so that trace 24 is a compound record corresponding to a plurality of detector channels. The arrangement is such that the deflection of the two coils is added.

If desired, in lieu of employing double-coil galvanometers each with a single mirror, single coils with double mirrors can be provided as shown in Fig. 4. The amplified detector channel from each amplifier 12 is applied to a galvanometer coil 30 suspended by a resilient suspension 31 from a support 32 and carrying upper and lower mirrors 33 and 34 disposed at right angles to each other as shown. A beam 21 from a light source (not shown in Fig. 4) is reflected from the upper mirrors of two adjacent coils to the traveling paper (not shown) and other beams are inter-reflected from the lower mirrors, as shown. If desired, lenses 70 can be interposed between adjacent mirrors, as shown, to concentrate the beams on the recording paper.

In this modification the deflection of each element is transferred through the light beam to an adjacent element as in Figs. 1, 2 and 3. The adjustment of the mirrors associated with each coil, to a 90-degree angle, should be carefully done, but each pair of mirrors need not be exactly at 90 degrees provided only that for the entire set the average angle between the mirrors is close to 90 degrees.

In the system of Fig. 4 a suitable permanent magnet (not shown) is provided for the coils. A separate magnet can be provided for each coil, or a single large magnet can be arranged for all the coils.

Fig. 5 illustrates an apparatus in which a fixed mirror is utilized to facilitate inter-reflections of the light beams among the galvanometer mirrors. A plurality of spaced galvanometer coils 40 are provided, each having an attached mirror 41 disposed to face a fixed, surface-silvered plane mirror 42. Considering a beam 21 from a lamp (not shown), the beam is first reflected from mirror 42 to the mirror of one coil, then again to mirror 42, back to the mirror of the next coil, to mirror 42, and thence at 22 toward the recording paper (not shown). Each galvanometer coil receives a signal channel as in the apparatus of Fig. 4. A large lens 170 plays a part similar to the ordinary single oscillograph galvanometer lens. As in the other embodiments the lens can be omitted if desired, though it is advantageous from the standpoint of image brightness and sharpness to provide a lens.

As stated, the invention is also applicable to variable-density recording in which a light beam is modulated, that is modified as regards strength rather than as regards direction, no moving parts being employed in the oscillograph elements. Fig. 6 shows such an apparatus, including a plurality of glow lamps 60, each receiving a signal channel. Each group of detectors 10 (only one group is shown) delivers an amplified signal in leads 13 as in Fig. 1, and the amplified signal is applied to a lamp through a potentiometric voltage regulator 43 connected across a battery 44, as shown. The light from the several lamps is intermingled with the aid of a branched manifold structure 45 made of lucite, glass, quartz or other transparent material adapted to convey light around curves by internal reflection within the material. The structure has three stems 46, 47 and 48, tapering down to wedge-like tips 49 disposed adjacent a traveling recording paper. Each stem has three branches, 50, 51 and 52, receiving light from three adjacent lamps, as shown. These branches terminate adjacent the lamps, as shown. The lamps are enclosed in a box 53 fitted with partitions 54 to prevent interference among the glow lamps.

In operation each resistor 43 is adjusted so that the corresponding lamp emits light of medium strength, such that, in the absence of an applied signal, a uniform gray band trace appears on the record. Then on appearance of an oscillating-detector signal the lamp current oscillates in strength above and below the median value, and a trace 55 is produced, of alternate light and dark transverse bands and lines as shown. Each trace is produced by flux from three adjacent lamps and the desired mixing of the detector channels is accomplished.

The showings of Figs. 1 to 6 are quite diagrammatic or schematic, and details which are conventional are omitted, for the sake of clarity of presentation. Provision of zero-adjusting means for the coils, suitable motors for driving the band of recording paper, etc. is within the expected skill of those versed in the art.

What I claim is:

1. In seismograph recording apparatus a traveling photosensitized recording band, at least two electro-optical oscillation-recording means comprising light source means and each adapted to modify light proportionally to applied signal strength, a plurality of separate seismic detector signal channels, circuit means for connecting said channels separately to said oscillation-recording means, and means for impinging light beams from at least two of said oscillation-recording means upon a single spot on the recording band, to produce a single composite record of the channels.

2. The apparatus of claim 1 wherein the light source means of the oscillation-recording means are glow lamps arranged to emit light at varying intensity proportionally to applied signal strength, the signal channels are connected by said circuit means to said glow lamps, and the means for impinging light on the band comprises a light-deflecting member delivering light from a plurality of the lamps to the same spot on the band.

3. In seismograph recording apparatus a traveling photosensitized recording band, light source means, at least two galvanometers each having a moving element carrying a mirror adapted to move proportionally to strength of signals applied to the galvanometer, said mirrors being so arranged with respect to each other and to the source that a beam from the source is reflected from one galvanometer mirror to another galvanometer mirror and thence toward the band, means for concentrating the beam of light upon the band to produce a record trace, at least two separate detector signal channels each including an electrical seismic wave detector, and circuit means for connecting the signal channels separately to the two galvanometers; whereby a composite record trace of detector signals is produced on the band.

4. An apparatus for recording seismograph detector signals with mixing of signal channels, comprising a plurality of detector signal channels, each channel including a seismic wave detector, a sensitized recording band, a plurality of light sources of intensity variable according to applied signal energy connected to said channels and adapted to send beams of light to the band, of energy corresponding to amplitude of applied signal energy, so as to produce record traces on the band, and means for commingling the beams of light from plural groups of the light sources before the beams of light impinge on the recording band, so that each trace is a composite record of a plurality of signal channels.

5. In apparatus for recording seismic detector signals, a plurality of separate signal channels each including a seismic wave detector adapted to produce electrical signals corresponding to seismic waves detected thereby, a plurality of glow lamps, current supply means for the lamps adapted to supply current thereto in amount such that each lamp emits a predetermined median light flux, circuit means for connecting a signal channel to each glow lamp whereby the light flux thereof fluctuates above and below said median value according to variations in amplitude of signal energy, a photosensitized recording band, and a plurality of light-transmitting members made of transparent material, each having a stem portion disposed adjacent the band to deliver light thereto and form a trace thereon and a plurality of branch portions disposed adjacent a plurality of the glow lamps, whereby each trace is produced by light flux from a plurality of glow lamps.

6. In methods of seismograph recording the improvement which comprises setting up light source means, modifying a plurality of light beams therefrom proportionally to the signal strength of a plurality of seismic detector signal channels, and directing light beams, each so modified by a plurality of channels, upon a single spot on a traveling photosensitized recording surface to produce a composite trace of said channels.

7. In methods of seismograph recording with the aid of beams of light impinging on a traveling pohtosensitized recording surface from a source of light, the improvement comprising modulating a plurality of separate beams of light proportionally to signal strength of a plurality of seismic detector signal channels, combining beams modulated by at least two channels and causing the combined beams to impinge on a traveling photosensitized recording surface at the same spot to produce a composite record trace of said channels.

8. In methods of seismograph recording, the improvement which comprises setting up light source means, successively deflecting a beam of light from said means proportionally to the signal strength of two separate seismic detector signal channels and directing the doubly-deflected beam upon a traveling photosensitized recording surface to produce a composite record trace of the two channels, deflecting a second beam of light from said source means proportionately to the signal strength of one of said two channels and a third separate channel and directing the second doubly-deflected beam upon another portion of the surface to produce a separate trace of the second and third channels.

9. In a seismograph recording apparatus a traveling photosensitized recording band, oscillograph galvanometer means comprising a plurality of current-carrying deflectable members adapted to deflect proportionally to the strength of electric signal energy applied thereto, circuit means for applying a plurality of detector signal channels to said deflectable members for deflection thereof, a light source, and reflecting means comprising mirrors on said deflectable members so arranged that light from the source undergoes successive reflections from mirrors of different deflectable members and thereafter impinges on the band to form record traces.

10. The apparatus of claim 9 wherein a pair of deflectable members is provided for each detector channel, and each deflectable member carries one mirror adapted to reflect light to a mirror on one of an adjacent pair of deflectable members.

11. The apparatus of claim 9 wherein one deflectable member is provided for each signal channel, and each deflectable member carries two mirrors, one receiving light from one of the mirrors on one adjacent deflecting member and the other directing light toward one of the mirrors of another adjacent deflecting member.

12. In seismograph recording apparatus including a plurality of separate seismic detector signal channels, a traveling photosensitive recording surface, a plurality of oscillation-recording elements each including light source means for emitting light beams, light directing means in the path of light beams from the source means to the surface to form a record trace thereon, one of said means being variable in response to amplitude of electrical signal energy, and circuit means for applying a detector signal channel to each of said oscillation-recording elements; the improvement comprising additional light directing means in the paths of said light beams from each source to the traveling surface, adapted to send light issuing from the directing means of each oscillation-recording element to the directing means of another oscillation-recording element, whereby each record trace is formed by light beams modified by at least two of said signal energy responsive means.

13. An apparatus for seismic recording comprising a traveling photosensitive recording band, light source means emitting a plurality of beams of light impinging on the band at separate spots to form traces, a pair of electrically operated modulating means for each beam of light, for modulating each beam of light according to the magnitude of energy applied to said pair of electrically operated means, and separate detector signal channels connected to said pairs of electrically operated means, whereby each beam produces a trace which is a composite record of signals of two separate detector signal channels.

OTTO F. RITZMANN.